(No Model.)
F. W. COMMISKEY.
SPOON.
No. 349,144. Patented Sept. 14, 1886.
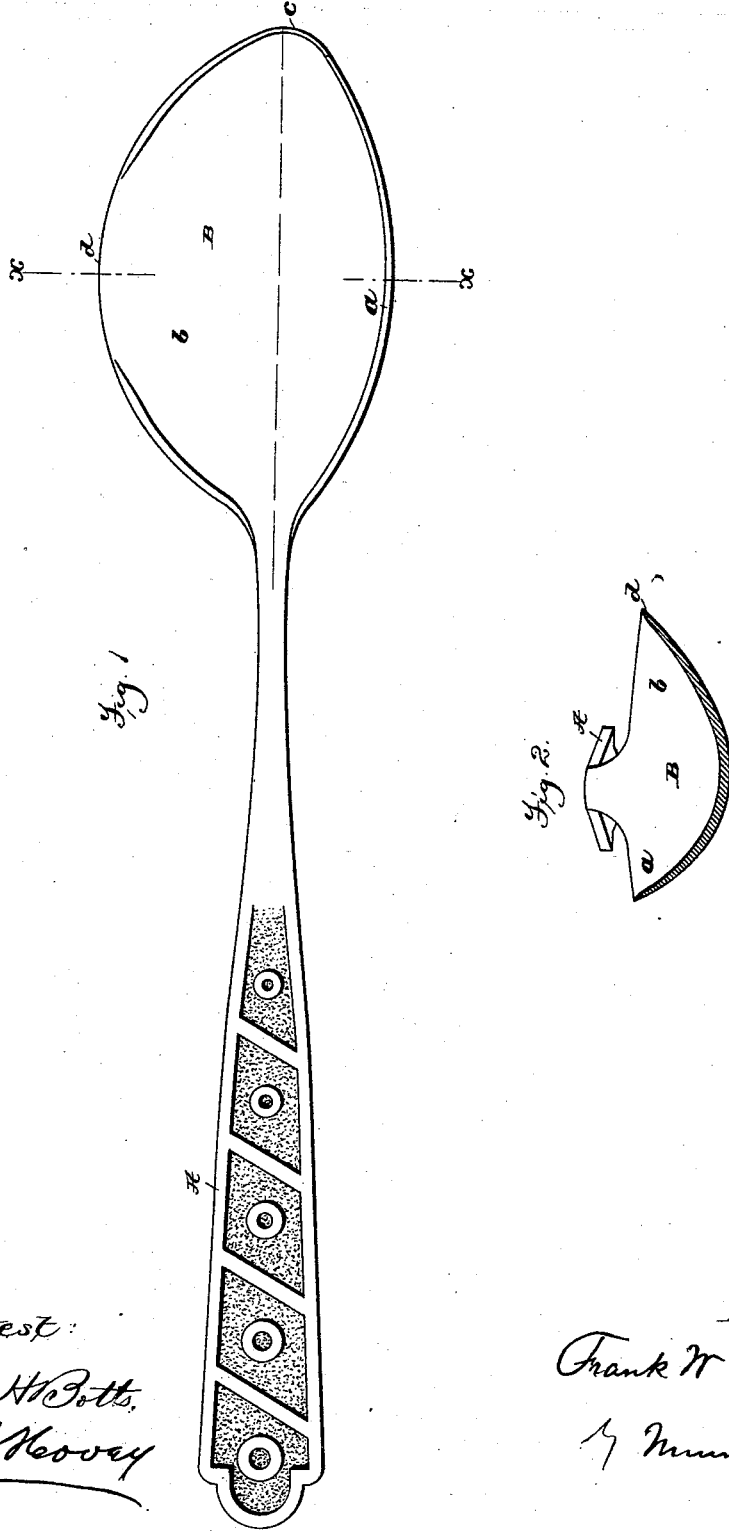

United States Patent Office.

FRANK W. COMMISKEY, OF BROOKLYN, NEW YORK.

SPOON.

SPECIFICATION forming part of Letters Patent No. 349,144, dated September 14, 1886.

Application filed April 27, 1886. Serial No. 200,278. (No model.)

*To all whom it may concern:*

Be it known that I, FRANK W. COMMISKEY, a citizen of the United States, residing at Brooklyn, county of Kings, and State of New York, have invented certain new and useful Improvements in Spoons, fully described and represented in the following specification and the accompanying drawings, forming a part of the same.

This invention relates to the construction of ordinary table-spoons, and particularly of those spoons which are designed for use in eating soup.

In soup and other table-spoons as ordinarily constructed the bowl or body of the spoon is of oval form, the handle extending from one end of the oval, and both sides of the oval being of the same outline. In eating from a spoon of this form it is of course most convenient to pour or take the contents of the spoon from the narrow end of the oval bowl, which is directly opposite to and in line with the handle. To do this it is of course necessary to put that portion of the bowl of the spoon to the mouth, and this occasions an awkward movement of the hand and wrist. In order to avoid this awkward movement of the hand and wrist, it has become customary in eating soup and other food from a spoon to take the food from the side of the spoon, instead of from its end, and it is now considered a mark of ill-breeding to eat from a spoon in any other manner. With a spoon of the ordinary form, however, and particularly if the spoon is large, it is not easy to take the contents into the mouth from the side without danger of spilling some portion of it.

In some cases spoons have been constructed in which the handle was attached to the side of and extended at right angles to the oval body; but this made the spoon very awkward in appearance, and made it impossible to use it the same as an ordinary spoon.

It is the object of the present invention to provide a spoon of such form that the contents can be taken into the mouth either from the end or side of the bowl without danger of spilling, and without the necessity of introducing the bowl of the spoon into the mouth to any considerable extent.

To this end the invention consists in a spoon having an oval bowl, to one end of which the handle is connected, and one side of which is extended so that its outline forms a much more abrupt curve than the outline of the other side, and so that the contents of the bowl of the spoon can be taken into the mouth from the side of the spoon with the same facility that it can be taken from the end.

As a full understanding of the invention can be best obtained from an illustration of a spoon containing the improvement, reference is made to the accompanying drawings, in which—

Figure 1 is a plan view upon an enlarged scale of a spoon containing the invention; and Fig. 2 is a cross-section of the bowl of the spoon, taken upon the line $x\ x$ of Fig. 1, and looking toward the handle.

Referring to said figures, it is to be understood that the handle A of the spoon is of the ordinary form, and is joined to the end of the bowl B in the usual manner. The bowl B is of oval form, as is usual, and one of its sides, $a$, and its point $c$ are of substantially the usual form. Its other side, $b$, however, is extended so that its outline forms a much more abrupt curve than the outline of the side $a$, as shown in Fig. 1, and is made much shallower near its edge than the side $a$, as shown in Fig. 2. By this means the side $b$ of the bowl B is provided with a comparatively narrow overflow-point, $d$, from which, when the spoon is tipped, the contents of the bowl can be taken into the mouth with the same or nearly the same facility that it can be taken from the point $c$.

What I claim is—

The herein-described table-spoon, having a bowl, B, which is of oval form, and has the handle A connected to one of its ends, and has the usual point, $c$, opposite or in line with the handle, and having one of its sides, $b$, extended and shallowed to form the overflow-point $d$, substantially as described.

In testimony whereof I have hereunto set my hand in the presence of two subscribing witnesses.

FRANK W. COMMISKEY.

Witnesses:
JAS. A. HOVEY,
JAS. J. KENNEDY.